United States Patent
Hamilton et al.

(10) Patent No.: US 8,438,023 B1
(45) Date of Patent: May 7, 2013

(54) WARNING A USER WHEN VOICE INPUT TO A DEVICE IS LIKELY TO FAIL BECAUSE OF BACKGROUND OR OTHER NOISE

(75) Inventors: Robert William Hamilton, London (GB); Bjorn Erik Bringert, Bath (GB); Michael J. LeBeau, New York, NY (US); William J. Byrne, Davis, CA (US); John Nicholas Jitkoff, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/588,054

(22) Filed: Aug. 17, 2012

Related U.S. Application Data

(60) Provisional application No. 61/541,664, filed on Sep. 30, 2011.

(51) Int. Cl.
*G10L 15/20* (2006.01)
*G10L 15/00* (2006.01)

(52) U.S. Cl.
USPC ............................. 704/233; 704/231; 704/240

(58) Field of Classification Search .................. 704/231, 704/233, 240, 274
See application file for complete search history.

(56) References Cited

U.S. PATENT DOCUMENTS

| | | | |
|---|---|---|---|
| 5,970,446 A | 10/1999 | Goldberg et al. | |
| 6,324,499 B1 | 11/2001 | Lewis et al. | |
| 6,944,474 B2 | 9/2005 | Rader et al. | |
| 7,117,149 B1* | 10/2006 | Zakarauskas | 704/233 |
| 7,233,894 B2* | 6/2007 | Sorin | 704/207 |
| 7,246,059 B2* | 7/2007 | Behboodian et al. | 704/226 |
| 7,660,716 B1* | 2/2010 | Cohen et al. | 704/249 |
| 7,826,945 B2* | 11/2010 | Zhang et al. | 701/36 |
| 2003/0125943 A1* | 7/2003 | Koshiba | 704/238 |
| 2004/0166893 A1* | 8/2004 | Jang | 455/551 |
| 2011/0111805 A1* | 5/2011 | Paquier et al. | 455/563 |

\* cited by examiner

*Primary Examiner* — Jesse Pullias
(74) *Attorney, Agent, or Firm* — McDonnell Boehnen Hulbert & Berghoff LLP

(57) ABSTRACT

Methods and devices are disclosed for notifying a user of a likelihood of successful recognition in an environment by a voice recognition application. In one embodiment, the method includes a device recording a noise sample in an environment and making a comparison of the noise sample and at least one predetermined threshold. The method further includes, based on the comparison, determining a likelihood of successful recognition in the environment by a voice recognition application, and triggering a notification indicating the likelihood. In another embodiment, the device includes a microphone configured to record a noise sample in an environment, a processor, and data storage comprising instructions executable by the processor to make a comparison of the noise sample and at least one predetermined threshold, based on the comparison, determine a likelihood of successful recognition by a voice recognition application, and trigger a notification indicating the likelihood.

23 Claims, 5 Drawing Sheets

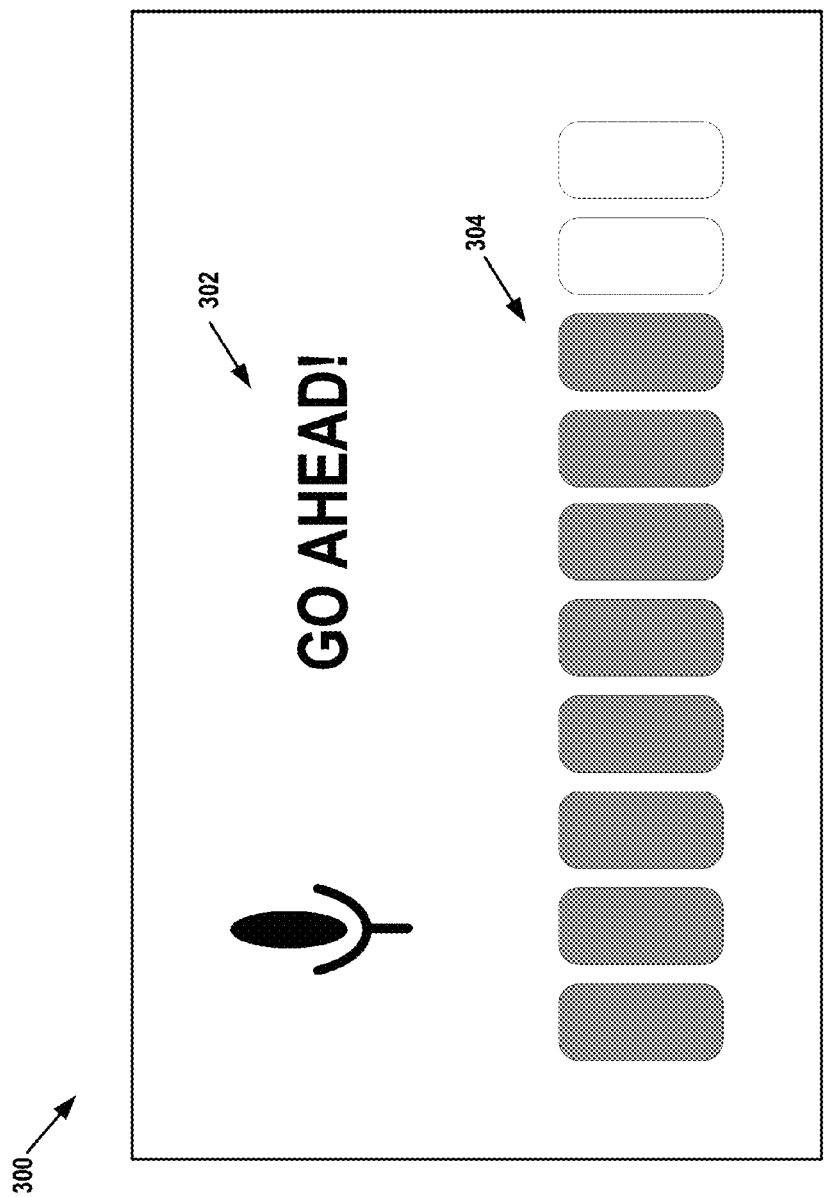

WARNING A USER WHEN VOICE INPUT TO A DEVICE IS LIKELY TO FAIL BECAUSE OF BACKGROUND OR OTHER NOISE

CROSS-REFERENCE TO RELATED APPLICATION

Priority is hereby claimed to U.S. Provisional Patent Application Ser. No. 61/541,664 filed Sep. 30, 2011, the contents of which are hereby incorporated by reference.

BACKGROUND

Voice recognition may allow a user to interact with a device without the use of the user's hands. In particular, a user may speak aloud a voice command. The device may record the user's speech, and may analyze the user's speech to identify the voice command. The device may then perform an action based on the voice command.

SUMMARY

Methods and devices for notifying a user that voice recognition may or should not be used in an environment are disclosed.

In one aspect, a method is disclosed. The method includes a device recording a noise sample in an environment and making a comparison of the noise sample and at least one predetermined threshold. The method further includes, based on the comparison, determining a likelihood of successful recognition in the environment by a voice recognition application, and triggering a notification indicating the likelihood.

In another aspect, a non-transitory computer readable medium is disclosed having stored therein instructions executable by a computing device to cause the computing device to perform functions including those of the method described above.

In still another aspect, a device is disclosed. The device includes at least one microphone configured to record a noise sample in an environment, and at least one processor. The device further includes data storage comprising instructions executable by the processor to make a comparison of the noise sample and at least one predetermined threshold, based on the comparison, determine a likelihood of successful recognition in the environment by a voice recognition application, and trigger a notification indicating the likelihood.

Other embodiments are described below. The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

FIGS. 3A-C illustrate an example implementation of a display for a voice recognition application, in accordance with an embodiment.

DETAILED DESCRIPTION

The following detailed description describes various features and functions of the disclosed devices and methods with reference to the accompanying figures. In the figures, similar symbols typically identify similar components, unless context dictates otherwise. The illustrative device and method embodiments described herein are not meant to be limiting. It will be readily understood that certain aspects of the disclosed devices and methods can be arranged and combined in a wide variety of different configurations, all of which are contemplated herein.

A device may be configured with a voice recognition application that is configured to detect voice commands spoken by a user and, in response to detecting the voice commands, trigger one or more actions. For example, the voice recognition application may be configured to detect a voice command requesting navigation to an address, and, in response to detecting the voice command, cause a map application to display a map illustrating a route to the address. Other examples are possible as well.

The voice recognition application may detect the voice commands by recording the user's speech and then analyzing the user's speech to detect the voice command. In some environments, however, such as those with ambient or background noise, the voice recognition application may have trouble recognizing the voice command amid the ambient or background noise. As a result, the voice recognition application may not trigger an action, or may trigger the wrong action. That is, the voice recognition application may be unsuccessful in recognizing the voice command.

Accordingly, when an environment includes ambient or background noise that may preclude successful voice recognition, it may be desirable for the device to notify the user that voice recognition may or should not be used (or will likely not be successful) in the environment. In particular, it may be desirable for the device to indicate to the user a likelihood of successful recognition in the environment by the voice recognition application.

An example method for detecting such an environment and notifying the user is described in connection with FIG. 1. Further, an example device configured to carry out the example method is described in connection with FIG. 2. An example implementation of a display for a voice recognition application is described in connection with FIGS. 3A-C.

Figure 1:
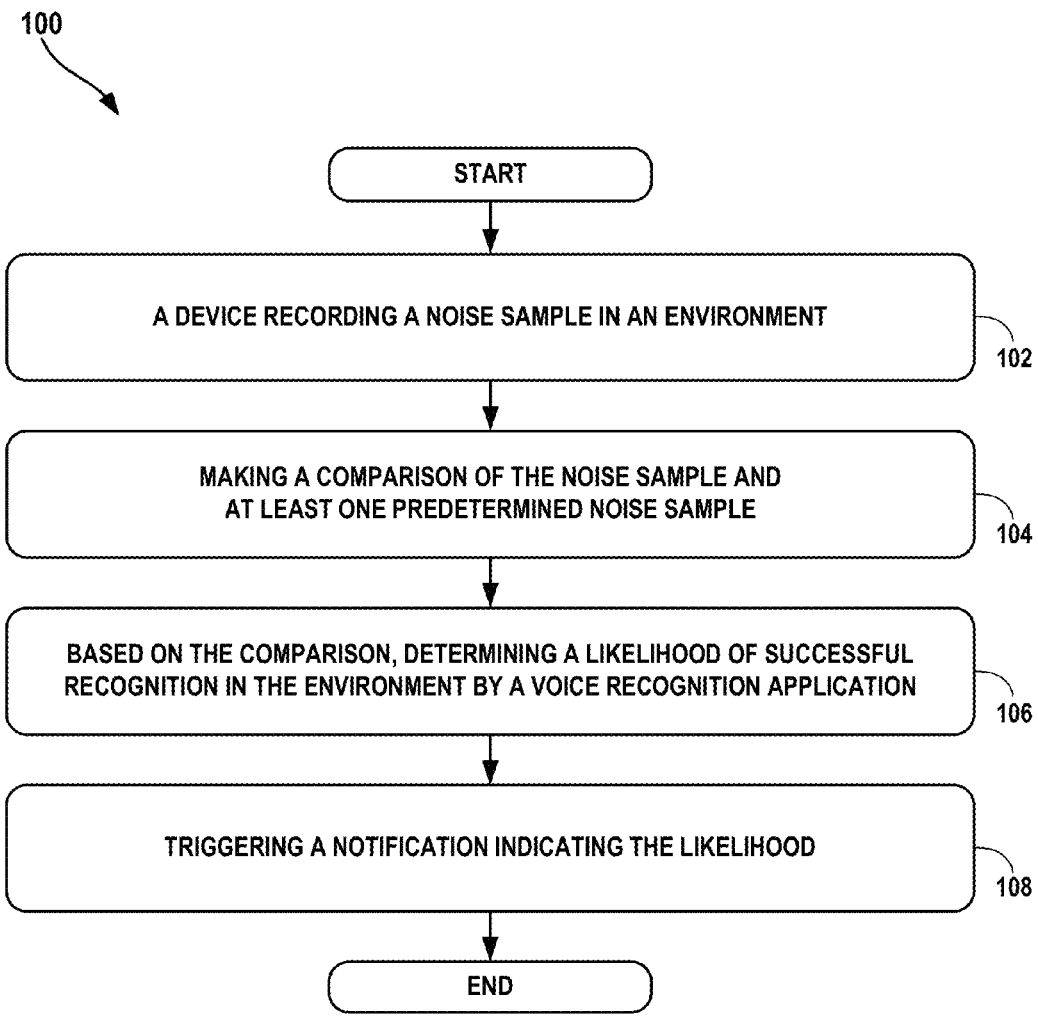
FIG. 1 shows a flow chart according to an embodiment of a method for notifying a user that voice recognition may or should not be used in an environment.

FIG. 1 shows a flow chart according to an embodiment of a method 100 for notifying a user that voice recognition may or should not be used in an environment.

Method 100 shown in FIG. 1 presents an embodiment of a method that, for example, could be used with the systems and devices described herein. Method 100 may include one or more operations, functions, or actions as illustrated by one or more of blocks 102-108. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, and compact-disc read only memory (CD-ROM), for example. The computer readable medium may also be any other volatile or non-volatile storage systems. The computer readable medium may be considered a computer readable storage medium, a tangible storage device, or other article of manufacture, for example.

In addition, for the method 100 and other processes and methods disclosed herein, each block may represent circuitry that is configured to perform the specific logical functions in the process.

As shown, the method 100 begins at block 102 where a device records a noise sample in an environment. In some embodiments, the device may continuously record a plurality of noise samples, and the noise sample may be one of the plurality of recorded noise samples. The plurality of recorded noise samples may have the same duration, or may have varying durations. For example, the recorded noise samples may have a predetermined duration. The device may store the plurality of recorded noise samples on the device. In some embodiments, the device may be configured to store only a fixed number of recorded noise samples on the device, and, once the fixed number of recorded noise samples has been stored, may continuously replace the oldest recorded noise sample stored on the device with the newest recorded noise sample. The device may store the plurality of recorded noise samples in other ways as well.

In other embodiments, the device may record the noise sample in response to a trigger. In some embodiments, in response to the trigger, the device may record the noise sample for a predetermined period of time, such that the recorded noise sample has a predetermined duration. The recorded noise sample may have other durations as well.

The trigger may take a number of forms. For example, the device may receive a request from a user for the voice recognition application and may responsively record the noise sample. The trigger may thus be the receipt of the request from the user. As another example, the device may detect that the device is located in the environment, and, based on the environment, may responsively record the noise sample. For instance, the device may detect that the device is in a restaurant or vehicle, each of which may include ambient or background noise, and may responsively record the noise sample. The trigger may thus be the detection of the environment. As yet another example, the device may detect an event on the device and may responsively record the noise sample. The event may be, for instance, an event that will likely be followed by a voice command, such as an incoming communication (e.g., a text message, email, or phone call) or the launching of an application that typically requires user input (e.g., a map application), or the voice command itself. Other events are possible as well. The trigger may thus be the detection of the event. As still another example, the device may detect that the device is connected to a power source and may responsively record the noise sample. This may be desirable, for instance, when recording the noise sample consumes more than a certain amount of power. The trigger may thus be detection of the power source. Other types of triggers are possible as well.

At block 104, the device makes a comparison of the recorded noise sample and at least one predetermined noise sample. The at least one predetermined noise sample may be an example of noise in which a voice recognition application may or should not be used. To this end, the at least one predetermined noise sample may include music, crowd noise, vehicle noise, white noise, loud noise, and/or other types of noise in which detection of a voice command from a user may be difficult for the voice recognition application. By comparing the recorded noise sample with the at least one predetermined noise sample, the device may determine whether the recorded noise sample is similar to noise in which a voice recognition application may or should not be used. The at least one predetermined noise sample may take a number of forms.

In some embodiments, the at least one predetermined noise sample may be predetermined based on a plurality of reference noise samples. For example, the predetermined noise sample may be an average (e.g., a moving average), combination, or other function of, or otherwise derived from, the plurality of reference noise samples. Other examples are possible as well.

Further, in some embodiments, the at least one predetermined noise sample may include a number of reference noise samples, each of which may correspond to a particular type of environment. For example, the at least one predetermined noise sample may include a reference noise sample for a vehicle environment, a reference noise sample for a restaurant environment, and a reference noise sample for a sporting event environment. Other examples are possible as well. In these embodiments, the device may make a comparison of the recorded noise sample and each of the reference noise samples, or, alternatively, may determine what type of environment the environment is (e.g., by determining a location of the device and a type of environment that is associated with or predetermined to be at the location, by capturing an image of the environment and processing the image to identify a type of the environment), and may make a comparison of the recorded noise sample and the reference noise sample for that type of environment.

As noted above, the comparison may indicate to the device whether the recorded noise sample is similar to noise in which a voice recognition application may or should not be used. To this end, the comparison of the recorded noise sample and the at least one predetermined noise sample may be a comparison of at least one of volume (e.g., amplitude) and noise type (e.g., speech, music, crowd noise, white noise, etc.) for the recorded noise sample and the at least one predetermined noise sample. In order to make the comparison, the device may determine a volume and/or a noise type of the recorded noise sample, and may determine a predetermined volume and/or a predetermined noise type of the predetermined noise sample. The device may then make a comparison of the volume and the predetermined volume, and/or the noise type and the predetermined noise type. Based on the comparison, the device may determine whether the recorded noise sample is similar to the predetermined noise sample and, in turn, similar to noise in which a voice recognition application may or should not be used. Similarity may be determined using, for example, Gaussian Mixture Models and/or other techniques.

Alternatively, at block 104 the device may make a comparison of the recorded noise sample and at least one predetermined threshold. The at least one predetermined threshold may be an example of a threshold beyond which a voice recognition application may or should not be used. To this end, the at least one predetermined threshold may be, for example, a volume threshold. Other predetermined thresholds are possible as well. By comparing the recorded noise sample with the at least one predetermined threshold, the device may determine whether the recorded noise sample exceeds a threshold beyond which a voice recognition application may or should not be used. The at least one predetermined threshold may take a number of forms.

In some embodiments, the at least one predetermined threshold may be predetermined based on a plurality of reference noise samples. For example, the predetermined threshold may be an average (e.g., a moving average), combination, or other function of, or otherwise derived from, one or more measurements (e.g., volume) of the plurality of reference noise samples. Other examples are possible as well.

Further, in some embodiments, the at least one predetermined threshold may include a number of predetermined thresholds, each of which may correspond to a particular type of environment. For example, the at least one predetermined threshold may include a predetermined threshold for a vehicle environment, a predetermined threshold for a restaurant environment, and a predetermined threshold for a sporting event environment. Other examples are possible as well. In these embodiments, the device may make a comparison of the recorded noise sample and each of the predetermined thresholds, or, alternatively, may determine what type of environment the environment is, as described above, and may make a comparison of the recorded noise sample and the predetermined threshold for that type of environment.

As noted above, the comparison may indicate to the device whether the recorded noise sample exceeds the predetermined threshold beyond which a voice recognition application may or should not be used.

The method 100 continues at block 106 where, based on the comparison, the device determines a likelihood of successful recognition in the environment by a voice recognition application. For example, if the comparison indicates that the recorded noise sample is similar to the predetermined noise sample and, in turn, similar to noise in which a voice recognition application may or should not be used, the device may determine that a likelihood of successful recognition in the environment is low. If, on the other hand, the comparison indicates that the recorded noise sample is not similar to the predetermined noise sample and, in turn, not similar noise in which a voice recognition application may or should not be used, the device may determine that a likelihood of successful recognition in the environment is high. For a comparison that indicates that the recorded noise sample is somewhat similar to the predetermined noise sample and, in turn, somewhat similar noise in which a voice recognition application may or should not be used, the device may determine that a likelihood of successful recognition is medium. In some embodiments, a measure of similarity may be determined, and the likelihood may be determined as a function of the similarity. The likelihood may, for example, be proportional to the similarity, or may be related to the similarity by a pre-set function. Other examples are possible as well.

The method 100 continues at block 108 where the device triggers a notification indicating the likelihood of successful recognition in the environment by the voice recognition application. The notification may be triggered before, while, or after a voice command is received from the user. The notification may take several forms. In some embodiments, the notification may be a visual notification, such as a graphic, a message, or an illuminated or blinking light. Alternatively or additionally, the notification may be an audible notification, such as an alarm, sound clip, or message (e.g., prerecorded message or text-to-speech message). Still alternatively or additionally, the notification may be a tactile notification, such as a vibration. In some embodiments, the notification may be any combination of visual, audible, and tactile notifications. Further, in some embodiments, the notification may include an indication of how a user might modify the environment such that the voice recognition application might then be used. The indication may be, for example, a suggestion to turn down music playing in the environment, or a suggestion to move to a quieter environment. Other examples are possible as well. The notification may take other forms as well.

In some embodiments, the notification may continue for a predetermined amount of time. In other embodiments, the notification may continue until a user acknowledges the notification through, for example, a user input. In still other embodiments, after triggering the notification, the device may continue to record noise samples and make comparisons. In these embodiments, the notification may continue until the next noise sample is recorded. Further, in these embodiments, the device may continue to record noise samples and make comparisons for a predetermined amount of time and/or until a trigger occurs. The trigger may be, for example, a request from the user to close or end the voice recognition application, a detection that the device is no longer located in the environment, a detection that an event on the device has ended, or a detection that the device is no longer connected to a power source. Other examples are possible as well.

Figure 2:
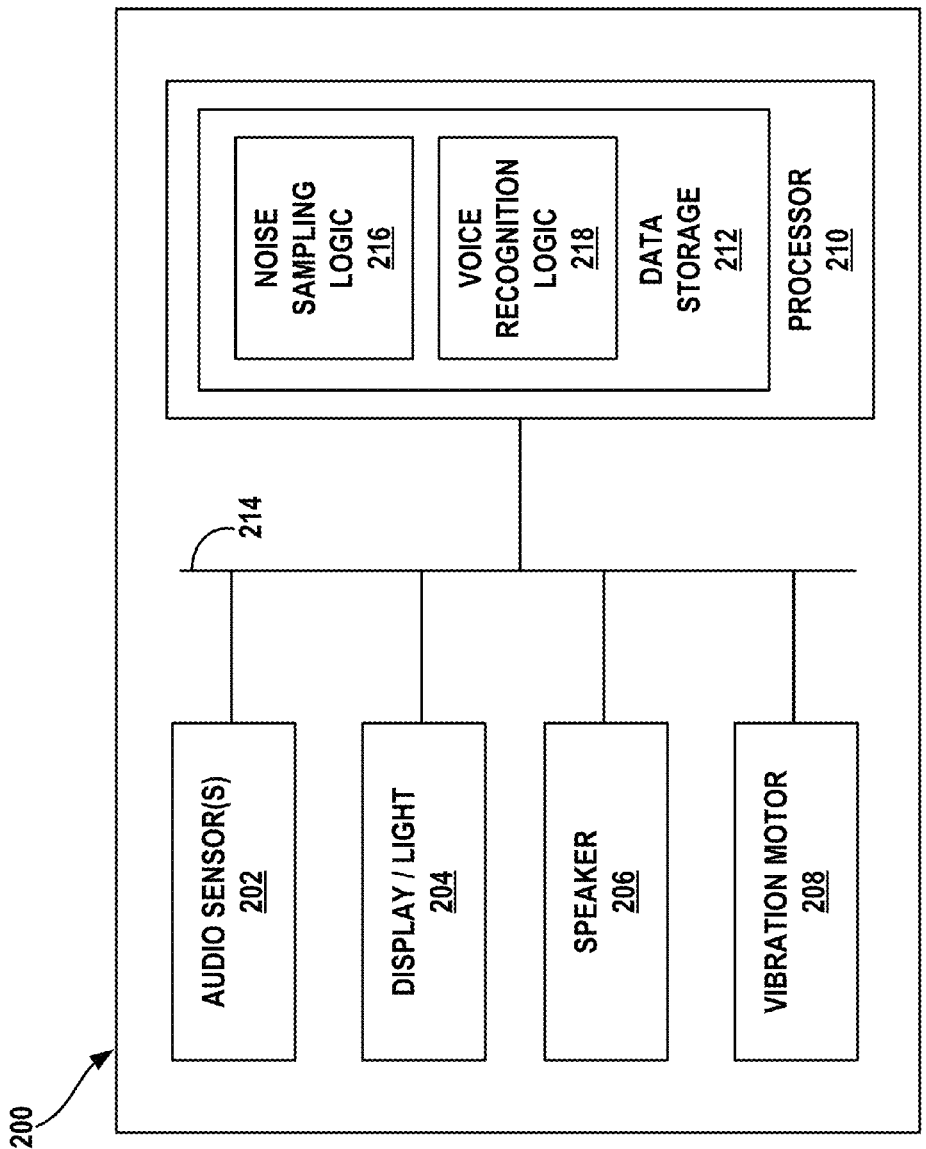
FIG. 2 shows a block diagram of an example device, in accordance with an embodiment.

FIG. 2 shows a block diagram of an example device 200, in accordance with an embodiment. As shown, the device 200 includes at least one audio sensor 202, a display and/or light 204, a speaker 206, a vibration motor 208, a processor 210, and data storage 212, all of which may be communicatively linked together by a system bus, network, and/or other connection mechanism 214.

The device 200 may be, for example, a mobile device, such as a cellular phone, smartphone, tablet computer, laptop computer, or a head-mounted or otherwise wearable computer. Alternatively, the device 200 may be, for example, a desktop computer, or a computer embedded in another device, such as a vehicle or an appliance. Other devices 200 are possible as well.

The at least one audio sensor 202 may be any audio sensor configured to record a noise sample in an environment, such as a microphone or other sound transducer. In some embodiments, the at least one audio sensor 202 may be further configured to record a voice command from a user for use in a voice recognition application. In these embodiments, the at least one audio sensor 202 may comprise a single audio sensor configured to record both the noise sample and the voice command, or may comprise one audio sensor configured to record the noise sample and an additional audio sensor configured to record the voice command. The audio sensor configured to record the noise sample may be a lower power audio sensor than the audio sensor configured to record the voice command. Other audio sensors 202 are possible as well.

The display and/or light 204 may be any display and/or light configured to display the notification. For example, the display and/or light 204 may be a liquid crystal display and/or touchscreen configured to display a graphic, a message, or another visual notification. As another example, the display and/or light 204 may be one or more light-emitting diodes configured to illuminate or blink to display a visual notification. Other displays and/or lights 204 are possible as well.

The speaker 206 may be any speaker configured to emit the notification. For example, the speaker may be a loudspeaker configured to emit an audible notification, such as an alarm, sound clip, or message (e.g., prerecorded message or text-to-speech message). Other speakers are possible as well.

The vibration motor 208 may be any motor configured to vibrate the device 200, thereby emitting the notification. The vibration motor 208 may be, for example, a direct current motor that drives a gear to cause a tactile notification, such as a vibration. Other vibration motors 208 are possible as well.

The processor 210 may comprise one or more general-purpose processors and/or one or more special-purpose processors. To the extent the processor 210 includes more than one processor, such processors may work separately or in combination. Further, the processor 210 may be integrated in whole or in part with the detector 202, the output interface 204, the input interface 206, and/or with other components.

Data storage 212, in turn, may comprise one or more volatile and/or one or more non-volatile storage components, such as optical, magnetic, and/or organic storage, and data storage 212 may be integrated in whole or in part with the processor 210. As shown, data storage 212 contains noise sampling logic 216 and voice recognition logic 218. The noise sampling logic 216 may be executable by the processor 210 to carry out the device functions described above in connection with FIG. 1. Further, the voice recognition logic 218 may be executable by the processor 210 to run a voice recognition application configured to detect voice commands spoken by a user and, in response to detecting the voice commands, trigger one or more actions. The voice recognition application may detect the voice commands by recording the user's speech and then analyzing the user's speech to detect the voice command.

As noted above, in some environments, such as those with ambient or background noise, the voice recognition application may have trouble detecting the voice command amid the ambient or background noise. In these environments, the noise sampling logic 216 may determine a likelihood of successful recognition in the environment by the voice recognition application and may trigger a notification indicating the likelihood, as described above.

The device 200 may further include one or more components in addition to or instead of those shown.

For example, the device 200 may include one or more components for receiving manual input from a user of the device 200, such as, for example, buttons, a touchscreen, and/or any other elements for receiving inputs. Further, the device 200 may include analog/digital conversion circuitry to facilitate conversion between analog user input/output and digital signals on which the device 200 can operate.

As another example, the device 200 may include one or more additional sensors and/or tracking devices configured to sense one or more types of information. Example sensors include video cameras, still cameras, infrared sensors, optical sensors, biosensors, Radio Frequency identification (RFID) systems, wireless sensors, pressure sensors, temperature sensors, and/or magnetometers, among others. Depending on the additional sensors, data storage 212 may further include program logic executable by the processor 210 to control and/or communicate with the sensors, and/or transmit to the server data representing information sensed by one or more sensors.

As still another example, the device 200 may include one or more interfaces for communicating with one or more entities, such as servers, peripheral devices, or other devices. In some embodiments, the interfaces may be wireless interfaces, and the device 200 may include an antenna and a chipset for communicating with the entities over an air interface. The chipset or interfaces in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. In other embodiments, the interfaces may be wired interfaces, such as wired serial buses (e.g., universal serial buses or parallel buses). The interfaces may take other forms as well.

The device 200 may include other components as well.

Figure 3B:
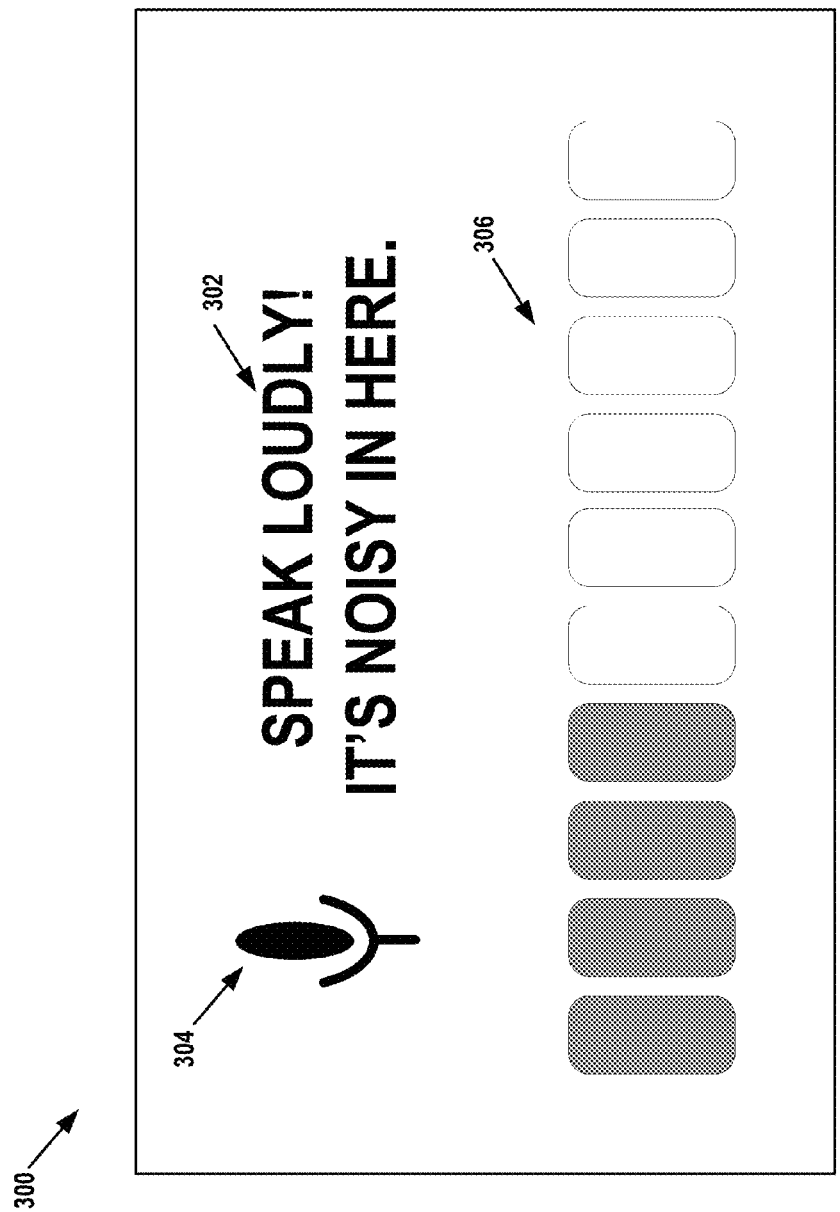
Figure 3C:
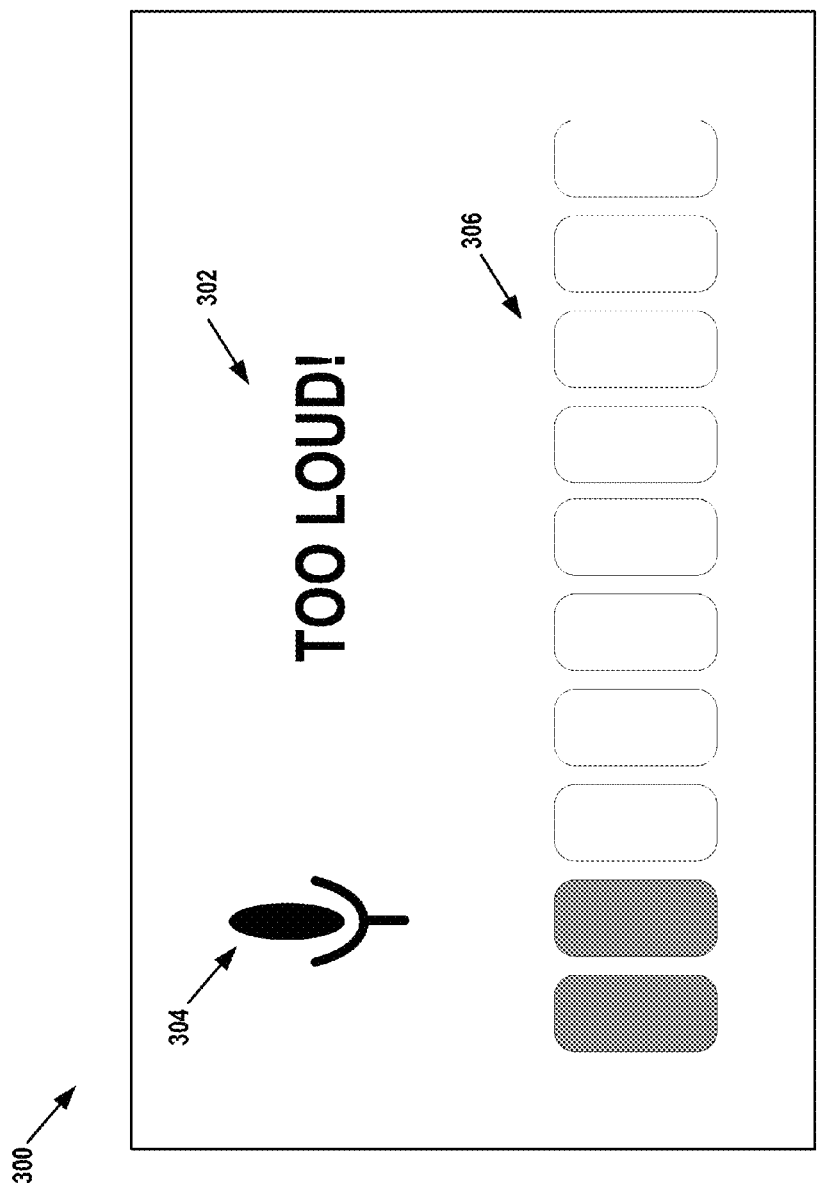

FIGS. 3A-C illustrate an example implementation of a display 300 for a voice recognition application, in accordance with an embodiment. The display 300 may, for example, be displayed on a display of a device, such as the device 200 described above. In some embodiments, the display 300 may be displayed in response to detection of an event on the device, such as, for example, an event that will likely be followed by a voice command (e.g., an incoming communication or the launching of an application that typically requires user input, etc.).

Following detection of the event, the device may record a noise sample in the environment and make a comparison of the noise sample and at least one predetermined noise sample, as described above. Then, based on the comparison, the device may determine a likelihood of successful recognition by a voice recognition application. The device may then generate the display including a notification indicating the likelihood. As shown, the display 300 includes both a textual notification 302 and a graphical notification 304 of the likelihood.

The textual notification 302 comprises text that indicates the likelihood to a user. In the embodiment shown, the textual notification 302 suggests that a user of the device "Go ahead!", indicating that a likelihood of successful recognition by the voice recognition application is high. In other embodiments, the textual notification 302 may indicate a qualitative value of the likelihood (e.g., "Likelihood is high.") and/or a quantitative value of the likelihood (e.g., "There is an 85% likelihood of successful recognition."). Other textual notifications 302 are possible as well.

The graphical notification 304 comprises a segmented bar that indicates the likelihood to the user. In the embodiment shown, most of the segments of the bar are filled in, indicating that a likelihood of successful recognition by the voice recognition application is high. In some embodiments, in addition to being filled in, the segments of the bar may be colored to indicate that the likelihood is high (e.g., the segments may be green). The graphical notification 304 may take any number of colors. In other embodiments, the graphical notification 304 may take other shapes, such as a non-segmented bar, a thermometer-style graph, or another shape. For example, the graphical notification 304 may take the form of two concentric circles in which the radii and/or the colors of the circles indicate the likelihood. In still other embodiments, the graphical notification 304 may be an illustrated and/or animated graphic, such as a cloud that is fuzzier for a lower likelihood and clearer for a higher likelihood. Other illustrated and/or animated graphics are possible as well. Other graphical notifications 304 are possible as well.

FIG. 3B illustrates textual and graphical notifications 302, 304 indicating that a likelihood of successful recognition by the voice recognition application is medium. As shown, the textual notification 302 suggests that a user of the device "Speak loudly!", indicating that a likelihood of successful recognition by the voice recognition application is only medium, thus requiring the user to speak loudly. In other embodiments, the textual notification 302 may indicate a qualitative and/or quantitative value of the likelihood as well, as described above. Other textual notifications 302 are possible as well. Similarly, on the graphical notification 304, only some of the segments of the bar are filled in, indicating that a likelihood of successful recognition by the voice recognition application is medium. In some embodiments, in addition to being filled in, the segments of the bar may be colored to indicate that the likelihood is medium (e.g., the segments may be yellow or orange). The graphical notification 304 may take any number of colors.

FIG. 3C illustrates textual and graphical notifications 302, 304 indicating that a likelihood of successful recognition by the voice recognition application is low. As shown, the textual notification 302 informs a user of the device that the environment is "Too loud!", indicating that a likelihood of successful recognition by the voice recognition application is low, such that a user may or should not use the voice recognition application in the environment. In other embodiments, the textual notification 302 may indicate a qualitative and/or quantitative value of the likelihood as well, as described above. Other textual notifications 302 are possible as well. Similarly, on the graphical notification 304, few segments of the bar are filled in, indicating that a likelihood of successful recognition by the voice recognition application is low. In some embodiments, in addition to being filled in, the segments of the bar may be colored to indicate that the likelihood is low (e.g., the segments may be red). The graphical notification 304 may take any number of colors.

While in the example implementation described in connection with FIGS. 3A-C the display includes both a textual notification 302 and a graphical notification 304, in other embodiments only one of a textual notification 302 and a graphical notification 304 may be included. In still other embodiments, such as those in which an audible or haptic notification is triggered, neither of a textual notification 302 and a graphical notification 304 may be included. Any combination of visual, audible, and haptic notifications is possible.

Further, while the example implementation described in connection with FIGS. 3A-C focused on high, medium, and low likelihoods, it is to be understood that other likelihoods could be indicated as well, including intermediary likelihoods and/or likelihoods on either a qualitative or a quantitative scale. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   a device recording a noise sample in an environment;
   making a comparison of the noise sample and at least one predetermined threshold;
   based on the comparison, determining a likelihood of successful recognition in the environment by a voice recognition application comprising determining whether the likelihood of successful recognition is high, medium, or low; and
   triggering a notification indicating the likelihood, comprising:
      after determining that the likelihood of successful recognition is high, triggering a notification that indicates that the likelihood of successful recognition is high,
      after determining that the likelihood of successful recognition is medium, triggering a notification that indicates that the likelihood of successful recognition is medium, and
      after determining that the likelihood of successful recognition is low, triggering a notification that indicates that the likelihood of successful recognition is low.

2. The method of claim 1, wherein the device recording the noise sample comprises the device recording the noise sample in response to a trigger.

3. The method of claim 2, wherein the trigger comprises at least one of (i) receiving a request from a user for the voice recognition application, (ii) detecting that the device is located in the environment, (iii) detecting an event on the device, and (iv) detecting that the device is connected to a power source.

4. The method of claim 1, wherein the device recording the noise sample comprises the device continuously recording a plurality of noise samples including the noise sample.

5. The method of claim 1, wherein:
   the noise sample has a volume;
   the at least one predetermined threshold includes a predetermined volume threshold; and
   making the comparison comprises making a comparison of the volume and the predetermined volume threshold.

6. The method of claim 1, wherein the at least one predetermined threshold is predetermined based on at least one predetermined noise sample.

7. The method of claim 6, wherein:
   the noise sample has a volume and a noise type;
   the at least one predetermined threshold includes a predetermined volume threshold;
   the at least one predetermined noise sample has a predetermined noise type; and
   making the comparison comprises making a comparison of at least one of (i) the volume and the predetermined volume threshold and (ii) the noise type and the predetermined noise type.

8. The method of claim 1, further comprising:
   determining a type of the environment; and
   based on the type of the environment, selecting the at least one predetermined noise sample from a plurality of predetermined noise samples.

9. The method of claim 1, wherein the notification comprises at least one of a visual notification, an audible notification, and a tactile notification.

10. A device comprising:
   at least one microphone configured to record a noise sample in an environment;
   at least one processor; and
   data storage comprising instructions executable by the processor to:
      make a comparison of the noise sample and at least one predetermined threshold;
      based on the comparison, determine a likelihood of successful recognition in the environment by a voice recognition application comprising determining whether the likelihood of successful recognition is high, medium, or low; and
      trigger a notification indicating the likelihood, comprising:
         after determining that the likelihood of successful recognition is high, triggering a notification that indicates that the likelihood of successful recognition is high,
         after determining that the likelihood of successful recognition is medium, triggering a notification that indicates that the likelihood of successful recognition is medium, and
         after determining that the likelihood of successful recognition is low, triggering a notification that indicates that the likelihood of successful recognition is low.

11. The device of claim 10, further comprising at least one of a display and a light configured to display the notification.

12. The device of claim 10, further comprising a speaker configured to emit the notification.

13. The device of claim 10, further comprising a vibration motor configured to emit the notification.

14. The device of claim 10, wherein the device is selected from the group consisting of a mobile telephone, a smartphone, a tablet computer, a laptop computer, a wearable computer, a desktop computer, a computer embedded in a vehicle, and a computer embedded in an appliance.

15. The device of claim 10, wherein the at least one microphone is further configured to record a voice input for use in the voice recognition application.

16. A device comprising:
  at least one microphone configured to record a noise sample in an environment;
  an indicator;
  at least one processor; and
  data storage comprising instructions executable by the processor to:
    make a comparison of the noise sample and at least one predetermined threshold;
    based on the comparison, determine a likelihood of successful recognition in the environment by a voice recognition application comprising determining whether the likelihood of successful recognition is high, medium, or low; and
  trigger, via the indicator, a textual notification indicating the likelihood and a graphical notification indicating the likelihood, comprising:
    after determining that the likelihood of successful recognition is high, triggering a textual notification that indicates that the likelihood of successful recognition is high and a graphical notification that indicates that the likelihood of successful recognition is high,
    after determining that the likelihood of successful recognition is medium, triggering a textual notification that indicates that the likelihood of successful recognition is medium and a graphical notification that indicates that the likelihood of successful recognition is medium, and
    after determining that the likelihood of successful recognition is low, triggering a textual notification that indicates that the likelihood of successful recognition is low and a graphical notification that indicates that the likelihood of successful recognition is low.

17. The device of claim 16, wherein the textual notification comprises at least one of a qualitative indication of the likelihood and a quantitative indication of the likelihood.

18. The device of claim 16, wherein the graphical notification comprises at least one of a qualitative indication of the likelihood and a quantitative indication of the likelihood.

19. A non-transitory computer readable medium having stored therein instructions executable by a computing device to cause the computing device to perform functions comprising:
  recording a noise sample in an environment;
  making a comparison of the noise sample and at least one predetermined threshold;
  based on the comparison, determining a likelihood of successful recognition in the environment by a voice recognition application comprising determining whether the likelihood of successful recognition is high, medium, or low; and
  triggering a notification indicating the likelihood, comprising:
    after determining that the likelihood of successful recognition is high, triggering a notification that indicates that the likelihood of successful recognition is high,
    after determining that the likelihood of successful recognition is medium, triggering a notification that indicates that the likelihood of successful recognition is medium, and
    after determining that the likelihood of successful recognition is low, triggering a notification that indicates that the likelihood of successful recognition is low.

20. The non-transitory computer readable medium of claim 19, wherein recording the noise sample comprises recording the noise sample in response to a trigger.

21. The non-transitory computer readable medium of claim 19, wherein recording the noise sample comprises continuously recording a plurality of noise samples including the noise sample.

22. The non-transitory computer readable medium of claim 19, wherein the at least one predetermined threshold is predetermined based on at least one predetermined noise sample.

23. The non-transitory computer readable medium of claim 19, wherein the notification comprises at least one of a visual notification, an audible notification, and a tactile notification.

* * * * *